(12) United States Patent
Strieter et al.

(10) Patent No.: US 11,050,323 B2
(45) Date of Patent: Jun. 29, 2021

(54) MOTOR WITH PULLEY MACHINED ON SHAFT AND BRAKE AND STEERING ASSEMBLIES INCLUDING THE SAME

(71) Applicant: MANDO CORPORATION, Pyeongtaek-si (KR)

(72) Inventors: Troy Strieter, Sebewaing, MI (US); Hee Kwon Jo, Bay City, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 508 days.

(21) Appl. No.: 16/118,432

(22) Filed: Aug. 31, 2018

(65) Prior Publication Data

US 2019/0245412 A1  Aug. 8, 2019

Related U.S. Application Data

(60) Provisional application No. 62/627,114, filed on Feb. 6, 2018, provisional application No. 62/634,140, filed on Feb. 22, 2018, provisional application No. 62/627,116, filed on Feb. 6, 2018.

(51) Int. Cl.
| | |
|---|---|
| *H02K 7/10* | (2006.01) |
| *H02K 7/00* | (2006.01) |
| *F16D 65/28* | (2006.01) |
| *F16H 7/02* | (2006.01) |
| *B62D 5/00* | (2006.01) |
| *F16H 55/17* | (2006.01) |

(52) U.S. Cl.
CPC .......... *H02K 7/1008* (2013.01); *B62D 5/006* (2013.01); *F16D 65/28* (2013.01); *F16H 7/023* (2013.01); *F16H 55/171* (2013.01); *H02K 7/003* (2013.01); *H02K 7/1004* (2013.01)

(58) Field of Classification Search
CPC ...... H02K 7/1008; H02K 7/003; B26D 5/006; F16D 65/28; F16H 55/171
USPC ....................................................... 310/67 R
See application file for complete search history.

(56) References Cited

U.S. PATENT DOCUMENTS

2012/0186896 A1*  7/2012  Yamamoto ........... B62D 5/0448
180/444

\* cited by examiner

*Primary Examiner* — Terrance L Kenerly
(74) *Attorney, Agent, or Firm* — Ladas & Parry, LLP

(57) ABSTRACT

A motor assembly may comprise: a motor rotor shaft; and a flange attached to the motor rotor shaft, at least a part of an inner surface of the flange contacted with a first part of a circumferential surface of the motor rotor shaft, wherein the motor rotor shaft comprises: a toothed pulley directly machined on a second part of the circumferential surface of the motor rotor shaft to be coupled with a drive belt, the toothed pulley of the motor rotor shaft having a diameter smaller than the first part of the motor rotor shaft contacting the flange; and a step part disposed between the first and second parts of the motor rotor shaft, the step part of the motor rotor shaft having a diameter gradually increasing from the toothed pulley to the first part of the motor rotor shaft contacting the flange.

19 Claims, 7 Drawing Sheets

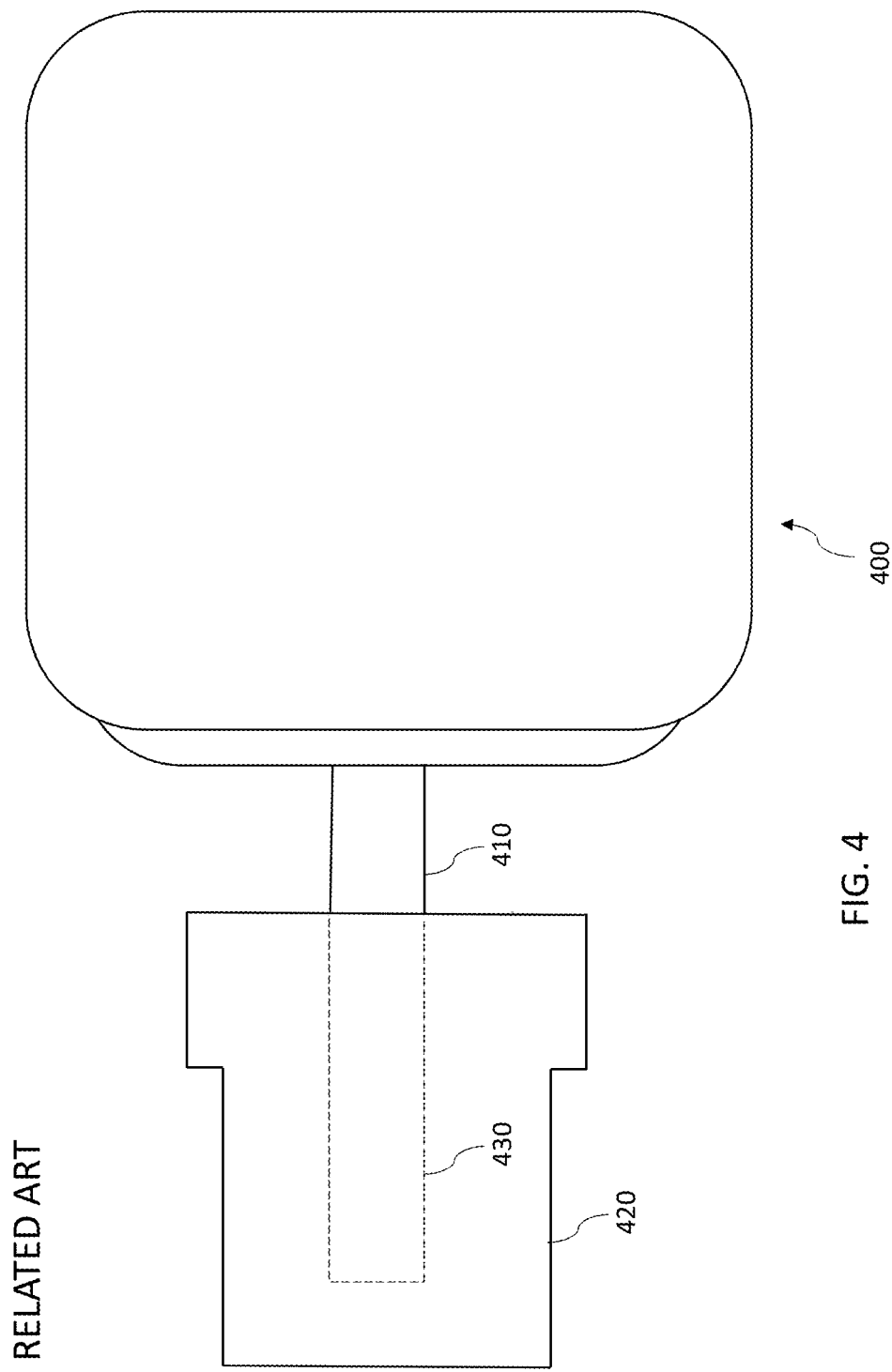

MOTOR WITH PULLEY MACHINED ON SHAFT AND BRAKE AND STEERING ASSEMBLIES INCLUDING THE SAME

CROSS REFERENCE TO PARENT APPLICATIONS

This application claims the benefit of U.S. Patent Application Ser. No. 62/627,114, filed on Feb. 6, 2018, entitled "ELECTRIC BRAKE AND CALIPER—DUAL STAGE BELT DRIVE MECHANISM"; U.S. Patent Application Ser. No. 62/634,140, filed on Feb. 22, 2018, entitled "PULLEY INTEGRAL TYPE SHAFT"; and U.S. Patent Application Ser. No. 62/627,116, filed on Feb. 6, 2018, entitled "STEER-BY-WIRE HANDWHEEL ACTUATOR—BELT DRIVE MECHANISM", which are all hereby incorporated by reference in their entireties.

CROSS REFERENCE TO RELATED PATENT APPLICATIONS

This application is related to U.S. patent application Ser. No. 16/118,437, entitled "ELECTROMECHANICAL ACTUATOR PACKAGE WITH MULTI-STAGE BELT DRIVE MECHANISM", filed on Aug. 31, 2018; and U.S. patent application Ser. No. 16/118,434, entitled "ELECTROMECHANICAL ACTUATOR PACKAGE WITH BELT DRIVE MECHANISM FOR STEER-BY-WIRE HAND WHEEL ACTUATOR", filed on Aug. 31, 2018. All of these applications are incorporated herein by reference in their entireties.

TECHNICAL FIELD

Some embodiments of the present disclosure generally relate to a toothed pulley directly machined on a surface of a motor rotor shaft and brake and steering assemblies including a motor with the toothed pulley.

BACKGROUND

In automotive vehicles, motors are often used in various components such as brake and steering assemblies. To transfer the rotation of a rotor shaft of the motor to other component of the vehicle, a timing belt can be rotatably coupled to the rotor shaft. A pulley may be mounted to the rotor shaft of the motor to prevent belt skip and increase gripping contact with the timing belt. For example, referring to FIG. 4, a pulley 420 is assembled to a rotor shaft 410 of a motor 400. The pulley 420 has a hole 430 to receive the rotor shaft 410 of the motor 400. The rotor shaft 410 of the motor 400 is pressed in the hole 430 of the pulley 420. Accordingly, in conventional art, the pulley 420 is attached to the rotor shaft 410 of the motor 400 as a separate component.

It would be desirable to have an apparatus and method that take into account some of the issues discussed above, as well as other possible issues.

SUMMARY

The features and advantages of the present disclosure will be more readily understood and apparent from the following detailed description, which should be read in conjunction with the accompanying drawings, and from the claims which are appended to the end of the detailed description.

Accordingly to various exemplary embodiments of the present disclosure, a motor assembly may comprise: a motor rotor shaft; and a flange attached to the motor rotor shaft, at least a part of an inner surface of the flange contacted with a first part of a circumferential surface of the motor rotor shaft, wherein the motor rotor shaft comprises: a toothed pulley directly machined on a second part of the circumferential surface of the motor rotor shaft to be coupled with a drive belt, the toothed pulley of the motor rotor shaft having a diameter smaller than the first part of the motor rotor shaft contacting the flange; and a step part disposed between the first and second parts of the motor rotor shaft, the step part of the motor rotor shaft having a diameter gradually increasing from the toothed pulley to the first part of the motor rotor shaft contacting the flange.

In some embodiments of the present disclosure, the flange may be disposed around the step part of the motor rotor shaft and a portion of the toothed pulley and the flange may be spaced apart from the step part and the toothed pulley. The inner surface of the flange may not contact the step part of the motor rotor shaft and/or the toothed pulley of the motor rotor shaft.

In certain embodiments of the present disclosure, the toothed pulley may be formed on or adjacent to a distal end of the motor rotor shaft.

In some embodiments of the present disclosure, a tip of the toothed pulley may have a different shape from the other part of the threaded pulley.

According to certain embodiments of the present disclosure, an electromechanical actuator package for actuating a brake assembly may comprise: a motor comprising the motor rotor shaft discussed above; a multi-stage belt drive mechanism connecting the toothed pulley of the motor rotor shaft to an actuator output via a plurality of drive belts, the actuator output associated with the brake assembly; a circuit board; and a housing enclosing the motor, the multi-stage belt drive mechanism and the circuit board, wherein the circuit board is positioned between one end of the motor rotor shaft and an inner surface of the housing.

According to some embodiments of the present disclosure, an electromechanical actuator package for supplying toque to a handwheel may comprise: a motor comprising the motor rotor shaft discussed above; a belt drive mechanism connecting the toothed pulley of the motor rotor shaft to an actuator output via the drive belt, the actuator output connected to the handwheel; a circuit board; and a housing enclosing the motor, the drive mechanism and the circuit board, wherein the circuit board is positioned between one end of the motor rotor shaft and an inner surface of the housing.

A better understanding of the nature and advantages of the present disclosure may be gained with reference to the detailed description and the drawings below.

BRIEF DESCRIPTION OF THE DRAWINGS

Various embodiments in accordance with the present disclosure will be described with reference to the drawings, in which:

FIG. 4 shows a motor assembly according to the related art.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
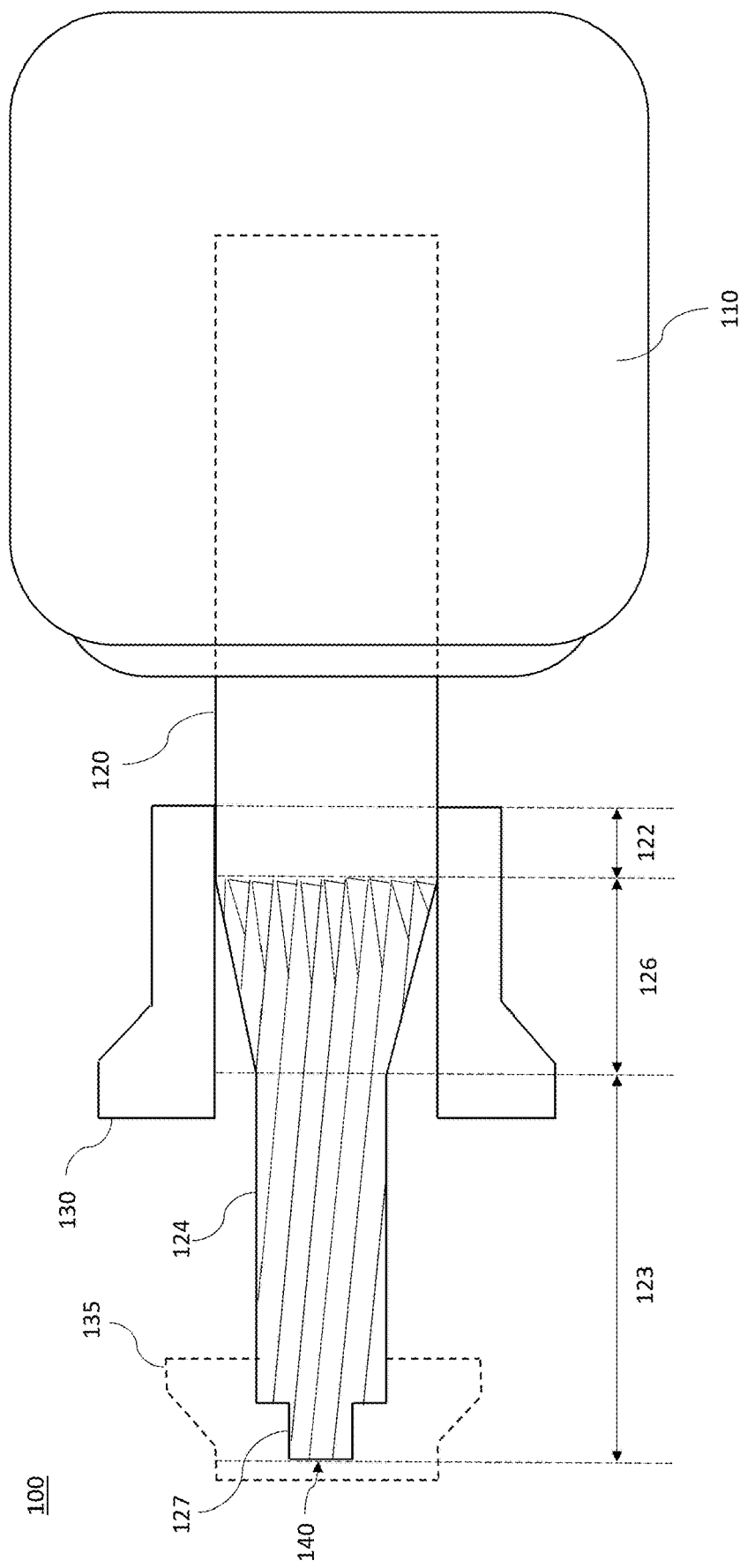
FIG. 1 illustrates a motor assembly according to an exemplary embodiment of the present disclosure.

FIG. 1 illustrates a motor assembly according to an exemplary embodiment of the present disclosure.

A motor assembly 100 may comprise a body 110. The body 110 of the motor assembly 100 may include, for example, but not limited to, an electromechanical assembly formed from component parts which are assembled along a central longitudinal axis, such as a rotor, a stator and a number of mechanical parts for rotatably mounting the rotor within the stator. The body 110 of the motor assembly 100 may also comprise a number of parts forming means for making electrical connections and a number of parts forming a housing.

A motor rotor shaft 120 may be rotatably coupled to the body 110 of the motor assembly 100. For example, the motor rotor shaft 120 may be affixed to the rotor included in the body 100 of the motor assembly 100 and extend out of the body 110 of the motor assembly 100.

The motor rotor shaft 120 comprises a toothed pulley 124. The term "toothed" may include "fluted" and/or "ridged". The toothed pulley 124 is directly machined on the circumferential surface of a second part 123 of the motor rotor shaft 120. The toothed pulley 124 may be formed on or adjacent to a distal end of the motor rotor shaft 120. Instead of mounting to the motor rotor shaft a pulley as a separate piece from the motor rotor shaft as shown in FIG. 4, the toothed pulley 124 according to the exemplary embodiment of the present disclosure is directly splined on the surface of the motor rotor shaft 120.

Figure 2:
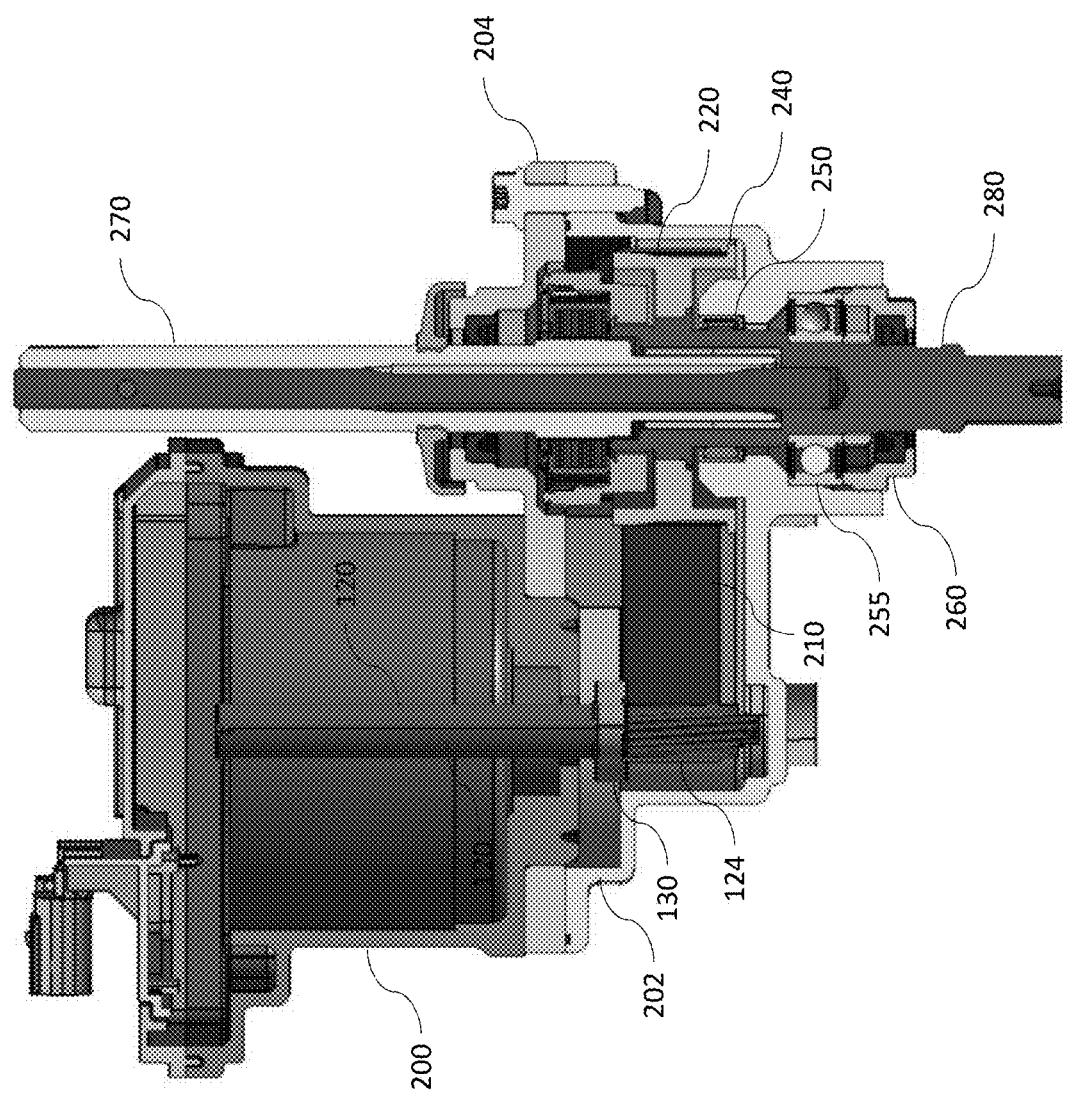
FIG. 2 shows a steering assembly including a motor assembly according to an exemplary embodiment of the present disclosure.
Figure 3A:
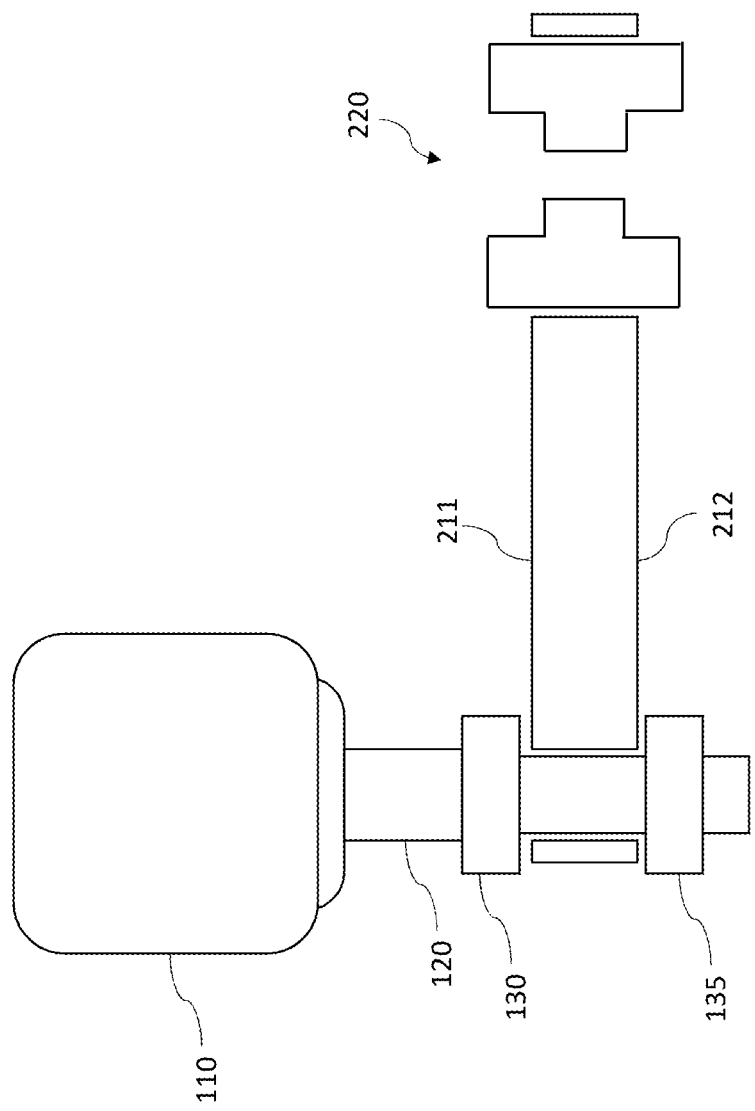
FIGS. 3A-3D illustrate various exemplary embodiments of flanges formed in or attached to a motor rotor shaft and/or a driven pulley.
Figure 3B:
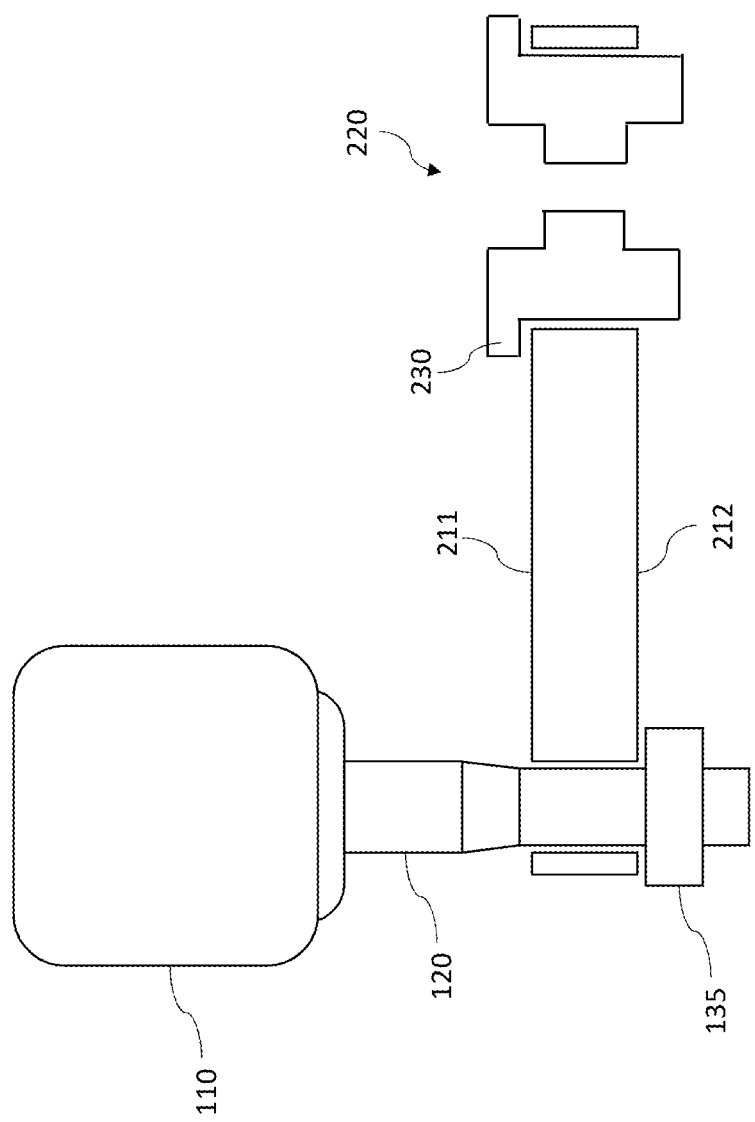
Figure 3C:
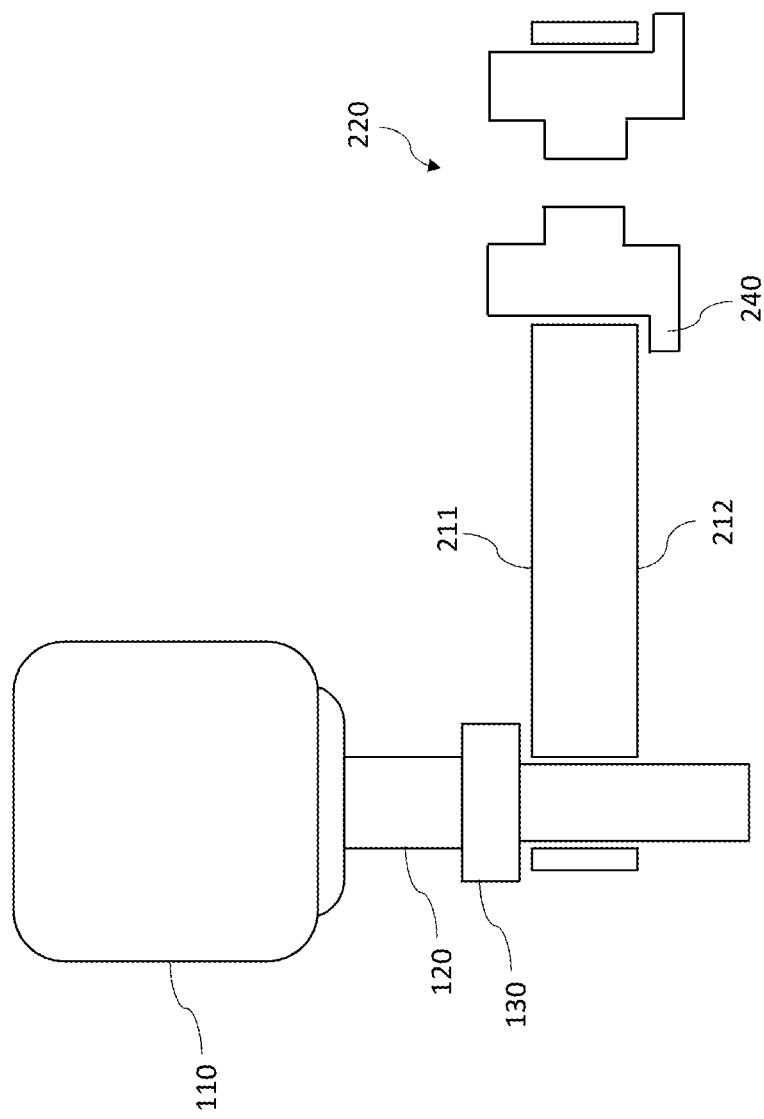
Figure 3D:
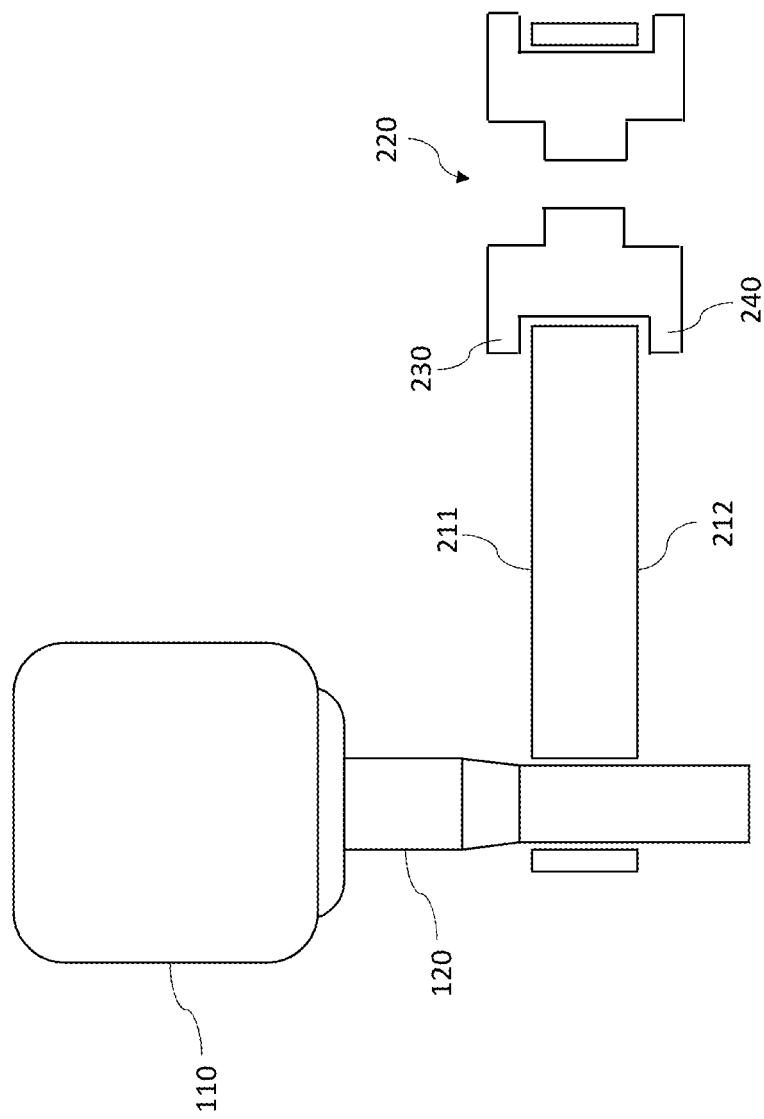

The toothed pulley 124 may be coupled with, for example, but not limited to, a drive belt 210 of FIG. 2 or a gear (not shown). The toothed pulley 124 may have an outer surface that engages an inner surface of the drive belt 210 of FIG. 2. The outer surface of the toothed pulley 124 can have any suitable contour or texture to help ensure a gripping contact between the drive belt 210 of FIG. 2 and the toothed pulley 124. For example, the outer surface of the toothed pulley 124 and the inner surface of the belt drive belt 210 of FIG. 2 can include toothed mating protrusions and/or notches formed therein. The toothed pulley 124 may have alternating teeth and grooves on its outer surface to be meshed with alternating grooves and teeth formed on the inner surface of the drive belt 210. The teeth and grooves may have any cross-sectional shape, for example, but not limited to, a V-shape, a U-shape, a square, a trapezoid and a half circle. The toothed pulley 124 may be rotatably coupled to a driven pulley 220 of FIG. 2 via the drive belt 210 of FIG. 2.

The diameter of the toothed pulley 124 formed on the circumferential surface of the motor rotor shaft 120 is smaller than the diameter of the other portion of the motor rotor shaft 120, e.g. a first part 122 of the motor rotor shaft 120, the untoothed portion of the motor rotor shaft 120, and/or the portion of the motor rotor shaft 120 disposed inside of the body 110 of the motor assembly 100. For example, the diameter of the outmost tooth portion of the toothed pulley 124 is less than the diameter of the untoothed portion of the motor rotor shaft 120 on which the toothed pulley is not formed.

The number of teeth formed on the toothed pulley 124 may be, for example, but not limited to, between fifteen and nineteen. In an exemplary embodiment, the number of teeth of the toothed pulley 124 may be a prime number. In another exemplary embodiment, the number of teeth of the toothed pulley 124 may be coprime to the number of teeth of the driven pulley 220 of FIG. 2 coupled via the drive belt 210 of FIG. 2. The prime number of teeth or the coprime relationship may reduce operational noise.

The tip 140 of the toothed pulley 124 may have a different shape from the other part of the toothed pulley 124. For example, one or more flat surfaces 127 may be formed at the tip 140 of the toothed pulley 124.

A step part 126 may be formed between the toothed pulley 124 and the untoothed portion of the motor rotor shaft 120, for example, but not limited to, between the toothed pulley 124 and the first part 122 of the motor rotor shaft 120. The diameter of the step part 126 may be gradually increasing from the toothed pulley 124 to the untoothed portion (e.g. the first part 122) of the motor rotor shaft 120. The surface of step part 126 may be toothed, fluted or ridged, although it is not required. The grooves and/or protrusions formed on the surface of the step part 126 may have a different shape from those of the toothed pulley 124.

A first flange 130 may be attached to the motor 100. For example, the first flange 130 may be mounted to the first part 122 of the motor rotor shaft 120. The first flange 130 may be configured to hold the drive belt 210 in position. The first flange 130 may prevent the drive belt 210 from riding off of the toothed pulley 124 due to the inherent thrusting tendency of the drive belt 210 as it operates around such pulley. At least a part of the inner surface of the first flange 130 may contact a circumferential surface of the first part 122 of the motor rotor shaft 120. The outer surface of the first part 122 of the motor rotor shaft 120 coupled with the first flange 130 may be untoothed or unnotched, although it is not required. The first part 122 of the motor rotor shaft 120 may have the same diameter as the portion of the motor rotor shaft 120 disposed in the body 110, although it is not required. The diameter of the first part 122 of the motor rotor shaft 120 may be larger than the diameters of both the toothed pulley 124 and the step part 126.

The first flange 130 may fully or partially cover the step part 126 of the motor rotor shaft 120. The first flange 130 may be coupled to only the first part 122 of the motor rotor shaft 120 and be spaced apart from the step part 126. For example, the inner surface of the first flange 130 may not contact the outer surface of the step part 126. The inside diameter of the first flange 130 may be larger than the outside diameters of the step part 126. However, the diameter of the edge of the step part 126 disposed adjacent to the first part 122 may be substantially equal to the inside diameter of the first flange 130. Alternatively, the first flange 130 may contact a portion of the step part 126 of the motor rotor shaft 120.

The first flange 130 may extend to cover a portion of the toothed pulley 124 while the first flange 130 is spaced apart from the toothed pulley 124. For example, the first flange 130 may be disposed around a portion of the toothed pulley 124, but the inner surface of the first flange 130 may not be contacted with the outer surface of the toothed pulley 124. The inside diameter of the first flange 130 may be larger than the outside diameters of the toothed pulley 124.

A second flange 135 may be mounted to the toothed pulley 124. For example, the second flange 135 may be attached to or adjacent to the tip 140 of the motor rotor shaft 120.

The flanges 130 and 135 are optional components. Either one or both of the first and second flanges 130 and 135 may be affixed to the motor rotor shaft 120.

FIGS. 3A-3D illustrate various exemplary embodiments of flanges formed in or attached to the motor rotor shaft 120 and/or the driven pulley 220. The drive belt 210 has a first side 211 and a second side 212. At least one flange may be provided at each of the first and second sides 211 and 212 of the drive belt 210. In a first embodiment shown in FIG. 3A, two flanges, the first and second flanges 130 and 135, are mounted to the motor rotor shaft 120 and support both sides 211 and 212 of the drive belt 210 while no flange is formed in or attached to the driven pulley 220. In a second embodiment of FIG. 3B, the second flange 135 attached to the tip 140 of the motor rotor shaft 120 supports the second side 212 of the drive belt 210 and a third flange 230 formed in the driven pulley 220 supports the first side 211 of the drive belt 210. In a third embodiment of FIG. 3C, the first flange 130 attached to the first part 122 of the motor rotor shaft 120 supports the first side 211 of the drive belt 210 and a fourth flange 240 formed in the driven pulley 220 supports the second side 212 of the drive belt 210. In a fourth embodiment shown in FIG. 3D, two flanges, the third and fourth flanges 230 and 240, are formed in the driven pulley 220 and support both sides 211 and 212 of the drive belt 210 while no flange is attached to the motor rotor shaft 120.

The motor assembly 100 according to the exemplary embodiments of the present disclosure may be used in electromechanical actuator packages for actuating a brake assembly disclosed in U.S. patent application Ser. No. 16/118,437, entitled "ELECTROMECHANICAL ACTUATOR PACKAGE WITH MULTI-STAGE BELT DRIVE MECHANISM", filed on Aug. 31, 2018, which is all incorporated herein by reference in their entireties, and electromechanical actuator packages for supplying toque to a handwheel disclosed in U.S. patent application Ser. No. 16/118,434, entitled "ELECTROMECHANICAL ACTUATOR PACKAGE WITH BELT DRIVE MECHANISM FOR STEER-BY-WIRE HAND WHEEL ACTUATOR", filed on Aug. 31, 2018, which is all incorporated herein by reference in their entireties.

FIG. 2 shows a steering assembly including a motor assembly according to an exemplary embodiment of the present disclosure.

A power pack 200 may comprise the motor assembly 100 of FIG. 1. Detailed exemplary embodiments of the power pack 200 are described as electromechanical actuator packages in U.S. patent application Ser. No. 16/118,437, entitled "ELECTROMECHANICAL ACTUATOR PACKAGE WITH MULTI-STAGE BELT DRIVE MECHANISM", filed on Aug. 31, 2018, which is all incorporated herein by reference in their entireties, and electromechanical actuator packages for supplying toque to a handwheel disclosed in U.S. patent application Ser. No. 16/118,434, entitled "ELECTROMECHANICAL ACTUATOR PACKAGE WITH BELT DRIVE MECHANISM FOR STEER-BY-WIRE HAND WHEEL ACTUATOR", filed on Aug. 31, 2018, which is all incorporated herein by reference in their entireties. The power pack 200 is coupled to a housing 202 with a housing cover 204.

The toothed pulley 124 of the motor rotor shaft 120 may be rotatably connected to the driven pulley 220 via the drive belt 210. The drive belt 210 may be affixed to the output shaft 280 fixedly coupled to an input shaft 270. Needle bearings 250 and ball bearings 255 may rotatably support the output shaft 280. A lock screw 260 may be disposed at an opening of the housing 202 to retain the output shaft 280.

According to some embodiments of the present disclosure, the motor assembly 100 may improve mechanical efficiency as well as reduce the packaging size, mass and variation in backdrive friction. Furthermore, the motor assembly 100 may reduce operational noise.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A motor assembly, comprising:
   a motor rotor shaft; and
   a flange attached to the motor rotor shaft, at least a part of an inner surface of the flange contacted with a first part of a circumferential surface of the motor rotor shaft,
   wherein the motor rotor shaft comprises:
   a toothed pulley directly machined on a second part of the circumferential surface of the motor rotor shaft to be coupled with a drive belt, the toothed pulley of the motor rotor shaft having a diameter smaller than the first part of the motor rotor shaft contacting the flange; and
   a step part disposed between the first and second parts of the motor rotor shaft, the step part of the motor rotor shaft having a diameter gradually increasing from the toothed pulley to the first part of the motor rotor shaft contacting the flange.

2. The motor assembly of claim 1, wherein the inner surface of the flange is spaced apart from the toothed pulley of the motor rotor shaft.

3. The motor assembly of claim 1, wherein the inner surface of the flange does not contact the step part of the motor rotor shaft.

4. The motor assembly of claim 1, wherein the flange is disposed around the step part of the motor rotor shaft and a portion of the toothed pulley and the flange is spaced apart from the step part and the toothed pulley.

5. The motor assembly of claim 1, wherein the toothed pulley is formed on or adjacent to a distal end of the motor rotor shaft.

6. The motor assembly of claim 1, wherein the step part of the motor rotor shaft has teeth on a circumferential surface of the step part of the motor rotor shaft.

7. The motor assembly of claim 1, wherein the drive belt comprises first and second sides opposed to each other and the drive belt couples the toothed pulley of the motor rotor shaft to a driven pulley, and the flange attached to the motor rotor shaft is disposed adjacent to the first side of the drive belt and a flange of the driven pulley is disposed adjacent to the second side of the drive belt.

8. The motor assembly of claim 7, wherein another flange of the driven pulley is disposed adjacent to the first side of the belt.

9. The motor assembly of claim 1, further comprising another flange attached to the toothed pulley of the motor rotor shaft.

10. The motor assembly of claim 1, wherein the number of teeth of the toothed pulley is between twelve and nineteen.

11. The motor assembly of claim 1, wherein the number of teeth of the toothed pulley is a prime number.

12. The motor assembly of claim 1, wherein the number of teeth of the toothed pulley is coprime to the number of a teeth of a driven pulley coupled with the toothed pulley via the drive belt.

13. The motor assembly of claim 1, wherein a tip of the toothed pulley has a different shape from the other part of the toothed pulley.

14. The motor assembly of claim 1, wherein the tip of the toothed pulley comprises one or more flat surfaces formed on the circumferential surface of the toothed pulley.

15. The motor assembly of claim 1, wherein the step part of the motor rotor shaft has teeth on a circumferential surface of the step part of the motor rotor shaft, and
the teeth of the step part of the motor rotor shaft has a different shape from a toothed shape of the toothed pulley.

16. An electromechanical actuator package for actuating a brake assembly, comprising:
the motor assembly of claim 1;
a multi-stage belt drive mechanism connecting the toothed pulley of the motor rotor shaft to an actuator output via a plurality of drive belts comprising the drive belt of claim 1, the actuator output associated with the brake assembly;
a circuit board; and
a housing enclosing the motor, the multi-stage belt drive mechanism and the circuit board, wherein the circuit board is positioned between one end of the motor rotor shaft and an inner surface of the housing.

17. The electromechanical actuator package of claim 15, wherein the multi- stage belt drive mechanism comprises:
the drive belt;
a first stage driven pulley connected to the motor rotor shaft via the drive belt;
a connecting shaft connecting the first stage driven pulley to a second stage drive pulley;
an other drive belt;
the second stage drive pulley connected to a second stage driven pulley via the other drive belt; and
the second stage driven pulley associated with the actuator output.

18. A electromechanical actuator package for supplying toque to a handwheel, comprising:
the motor assembly of claim 1;
a belt drive mechanism connecting the toothed pulley of the motor rotor shaft to an actuator output via the drive belt of claim 1, the actuator output connected to the handwheel;
a circuit board; and
a housing enclosing the motor, the drive mechanism and the circuit board, wherein the circuit board is positioned between one end of the motor rotor shaft and an inner surface of the housing.

19. The electromechanical actuator package of claim 18, wherein the belt drive mechanism comprises:
the drive belt; and
a driven pulley connected to the motor rotor shaft via the drive belt, the driven pulley associated with the actuator output.

* * * * *